United States Patent
Bergman et al.

[19]

[11] Patent Number: 6,042,369
[45] Date of Patent: Mar. 28, 2000

[54] FLUIDIZED-BED HEAT-TREATMENT PROCESS AND APPARATUS FOR USE IN A MANUFACTURING LINE

[75] Inventors: Charles H. Bergman, Ham Lake; Steve I. Krause, St. Paul, both of Minn.

[73] Assignee: Technomics, Inc., Plymouth, Minn.

[21] Appl. No.: 09/048,683

[22] Filed: Mar. 26, 1998

[51] Int. Cl.[7] .................................................. F27B 15/00
[52] U.S. Cl. .................................. 432/15; 432/58; 34/580
[58] Field of Search .......................... 432/14, 15, 58, 432/11, 121; 34/367, 370, 578, 589, 580

[56] References Cited

U.S. PATENT DOCUMENTS

| | | | |
|---|---|---|---|
| 3,795,487 | 3/1974 | Tamalet | 432/58 |
| 3,836,321 | 9/1974 | Kobayashi et al. | 432/15 |
| 3,972,513 | 8/1976 | Mobius et al. | 148/16 |
| 3,982,884 | 9/1976 | Godel | 432/58 |
| 4,221,579 | 9/1980 | Wright et al. | 65/114 |
| 4,316,718 | 2/1982 | Drugge | 432/58 |
| 4,383,823 | 5/1983 | Williams et al. | 432/148 |
| 4,399,984 | 8/1983 | Bouchon | 266/252 |
| 4,420,345 | 12/1983 | Ito et al. | 148/3 |
| 4,452,155 | 6/1984 | Ishihara et al. | 110/346 |
| 4,461,656 | 7/1984 | Ross | 148/16.6 |
| 4,586,293 | 5/1986 | De Spain et al. | 51/7 |
| 4,671,496 | 6/1987 | Girrell et al. | 266/78 |
| 4,698,913 | 10/1987 | Voll | 34/10 |
| 4,717,433 | 1/1988 | Weisert et al. | 148/20.3 |
| 4,730,811 | 3/1988 | Hattori et al. | 266/81 |
| 4,745,002 | 5/1988 | Vexler et al. | 427/52 |
| 4,752,061 | 6/1988 | Dalton et al. | 266/87 |
| 4,780,993 | 11/1988 | DeSpain et al. | 51/317 |
| 4,813,653 | 3/1989 | Piepers | 266/254 |
| 4,834,354 | 5/1989 | Yang | 269/156 |
| 4,881,987 | 11/1989 | Kambara et al. | 148/12 B |
| 4,916,865 | 4/1990 | DeSpain et al. | 51/7 |
| 4,958,006 | 9/1990 | Bernier et al. | 528/501 |
| 4,991,360 | 2/1991 | DeSpain | 51/317 |
| 5,039,301 | 8/1991 | Allen et al. | 432/58 |
| 5,039,357 | 8/1991 | Epler et al. | 148/16.6 |

(List continued on next page.)

FOREIGN PATENT DOCUMENTS

| | | |
|---|---|---|
| 0096010 | 12/1983 | European Pat. Off. . |
| 1458157 | 11/1966 | France . |
| 2448573 | 9/1980 | France . |
| 1002512 | 8/1965 | United Kingdom . |
| 1005056 | 9/1965 | United Kingdom . |
| WO97/30805 | 8/1997 | WIPO . |
| WO98/14291 | 4/1998 | WIPO . |

*Primary Examiner*—Teresa Walberg
*Assistant Examiner*—Gregory A. Wilson
*Attorney, Agent, or Firm*—Schwegman, Lundberg, Woessner & Kluth, P.A.

[57] ABSTRACT

A method for rapid heat treatment, quenching and aging of an article includes placing the article in a fluidized bed and conveying the article through the bed. Heat treatment, quenching and aging of the part can be done in less than two hours using this method. The method also includes removing fluidizing media from the article as the article is removed from the fluidized bed. An elevator is used to remove the article from the fluidized bed. The elevator may include a conveyor for moving the article into another fluidized bed. The article can then be placed into the second fluidized bed and conveyed through that bed. Each fluidized bed is controlled so that a specific heat treatment can be applied to the article by the fluidized bed. The fluidized bed can be used as a portion of an automated production line. The retort of the fluidized bed includes a system for recycling the air passed through the fluidizing media in the furnace. The recycling system includes a fan positioned above the fluidizing media in the retort, a filter for removing any fluidizing media within the recycled air, and piping for reintroducing the recycled air to the retort. The heaters are placed within the retort and include heat exchangers for heating the incoming combustion air. The heaters are rigidly attached at one end and fit within sleeves attached to another portion of the retort. The heater tubes can be replaced with refrigeration tubes or units so that articles may be quenched.

28 Claims, 7 Drawing Sheets

U.S. PATENT DOCUMENTS

| | | | |
|---|---|---|---|
| 5,080,729 | 1/1992 | Van Den Sype et al. | 148/13.1 |
| 5,145,534 | 9/1992 | Weedaeghe et al. | 148/596 |
| 5,161,315 | 11/1992 | Long | 432/58 |
| 5,225,005 | 7/1993 | Burrage et al. | 148/108 |
| 5,294,095 | 3/1994 | Heath et al. | 266/87 |
| 5,332,139 | 7/1994 | Heath et al. | 266/172 |
| 5,405,122 | 4/1995 | Burrage et al. | 266/103 |
| 5,405,428 | 4/1995 | Dube et al. | 75/403 |
| 5,535,990 | 7/1996 | Burrage et al. | 266/103 |
| 5,546,875 | 8/1996 | Selle et al. | 432/14 |
| 5,832,848 | 11/1998 | Reynoldson et al. | 110/348 |

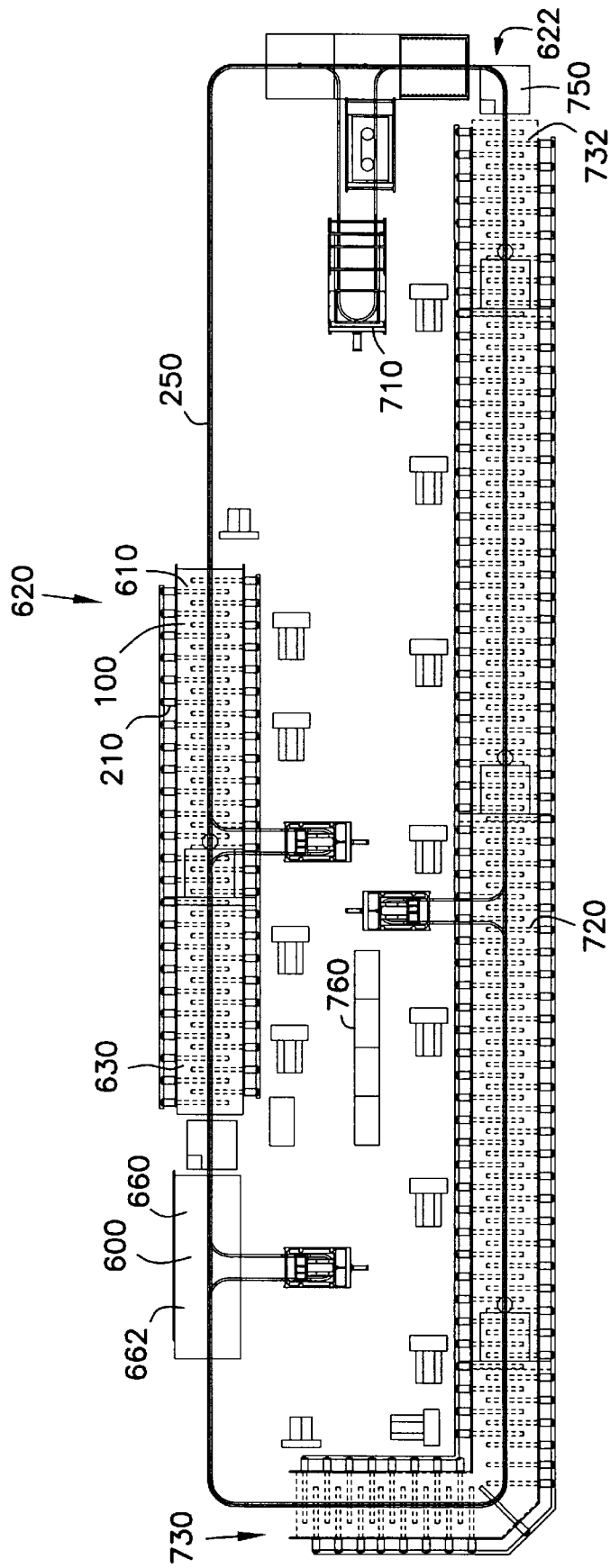

FLUIDIZED-BED HEAT-TREATMENT PROCESS AND APPARATUS FOR USE IN A MANUFACTURING LINE

FIELD OF THE INVENTION

The present invention relates generally to heat treating articles in a fluidized bed and more particularly to the use of several fluidized beds as stations in an automated manufacturing line.

BACKGROUND OF THE INVENTION

There are many methods for applying heat treatments to articles of manufacture. One method for heat treating an article of manufacture is to place it in a hot-air furnace. An article may be placed within a hot-air furnace and kept at a temperature for a specified period of time to provide certain heat treatments. There are problems with hot-air furnaces. Among the problems is that the heat-treating processes take a long time and therefore, the use of hot-air furnaces is not conducive to a manufacturing line having a high throughput. Another problem is that it is difficult to hold a temperature very closely within a hot-air furnace. The temperature can fluctuate as much as 50° C. With such fluctuations, it is difficult to get a uniform heat-treated article from a hot-air furnace. In other words, the properties of the heat-treated article also vary because the temperature within the hot-air furnace varies.

Articles are quenched to preserve or maintain a desirable grain structure. The typical method for quenching is to take the article and place it into a water bath. The water bath is typically at a temperature of at least 180° F. Placing an article having a much higher temperature into the water or liquid bath results in some of the water or liquid turning into a vapor. During the quenching process, portions of the article will be cooled by liquid and other portions will be cooled by the vapor. The liquid and vapor carry heat away from the article at different rates. In short, articles which are quenched in liquid or water baths have uneven cooling. Uneven cooling during a quench may result in distortions in the article. This is one of the problems associated with the traditional approaches to quenching a part or article.

Other methods for applying heat or removing heat from articles use a fluidized-bed furnace. The fluidized-bed furnace can be used to heat treat, quench or age a part. The main elements of a fluidized-bed furnace include a retort, a heating system and an air introduction system, such as an air manifold. In the bottom of the furnace is an air introduction system, through which a flow of fluidizing gas, generally air, enters the retort and fluidizes the fluidizing medium. The retort is filled with a fluidizing medium, such as fine-grained sand or stainless steel. A flow of fluidizing air enters the retort at the bottom and sets the particles in the medium in suspended motion. The fluidized-bed furnace uses the properties of a fluidized medium to transfer heat to or away from an article under treatment. The fluidized medium is physically similar to a liquid. The fluidizing medium is inert. As an inert medium that acts similar to a liquid, heat transfer to an article is usually rapid. Thus, the heat-transfer properties are superior to the heat-transfer properties of a hot air furnace. The temperature of the fluidizing medium and the time the part is exposed to the medium determines the type of treatment. A single retort furnace can be set up to deliver various heat treatments by changing the temperature setting and the atmosphere mixture. Although a single fluidizing medium can be used to heat treat, quench or age an article it should be pointed out that changing temperatures of the fluidization bed so that a different treatment can be applied typically takes from 10 to 24 hours.

There are problems with todays fluidizing beds. Some of the problems relate to heating the fluidized bed. The heating of the fluidized medium may not be uniform. In many fluidized beds, the heaters are placed on the outside of the retort. When placed outside the retort, the heating of the fluidized medium is not as uniform as when the heaters are placed directly into the retort. U.S. Pat. Nos. 4,752,061 and 5,294,095 both teach placing a heating element directly into the retort. In each of these particular fluidized beds, infrared lamps are the heating elements which are placed within the fluidized bed. There are problems with placing infrared lamps into a fluidized bed. First of all, the infrared lamps are fragile and will break easily. Secondly, ceramic seals used between the outside of the retort and the infrared lamp may break and allow sand to escape from the retort. Another problem is vitrification where the sand makes a portion of the quartz sleeve opaque. The lamp then overheats and the infrared lamp fails. When the heating element fails in the fluidized bed, the entire fluidized bed must be cooled down, the fluidizing medium must be removed, and the heating element must be replaced. The process of replacing a heating element takes a considerable amount of time. This time is wasted production time.

Another problem with current fluidized beds is that they use batch processing. A batch of parts are loaded into a basket and then lowered into the fluidized bed. The baskets are then loaded into the fluidized-bed furnace from above to load a number of individual parts or components into the fluidized bed. The baskets, racks or individual components are held within the fluidized bed for a prescribed or desired amount of time and then removed from the fluidized bed. Another batch of articles or parts are then heat treated using the same method. One problem associated with batch processing is that the parts or articles within the baskets are spaced so closely together that the fluidizing medium may not get to all the surfaces of the part or article. The result is uneven heating or cooling of the article.

Still another problem with current fluidized beds is that they waste energy. The fluidizing medium is heated to a prescribed temperature necessary to accomplish a heat-treatment process. Gas or air is heated as it passes through the fluidizing medium. After air passes through the fluidizing bed it is exhausted and a new supply of air is heated. Constantly heating the air robs energy from the fluidized bed. This is quite costly.

In order to save costs on energy, some fluidizing beds collapse the bed which means that air is no longer passed through the bed while the heat treatment is taking place. In other words, after a batch of parts or articles are placed in the bed, the fluidizing air is shut off and the bed collapses around the parts or articles while the heat treatment takes place. This is one way to save energy. Collapsing the bed requires batch processing.

Casting a part and removing it from a mold typically takes 5 to 12 minutes. Parts or articles can be output from a casting machine at a rate of one part or casting per five minutes. Current methods for treating parts require long treatment times. For example, heat treating a part may take as long as 12 hours in an open-air furnace. Aging a part may take as long as 8 hours. Because of the long cycle times associated with treating parts and the fact that castings are produced at a higher rate, batch processing seems necessary. One of the byproducts of batch processing is that it precludes the formation of a manufacturing line that can use continuous processing. Another byproduct of batch processing is that it requires the castings to be stacked and cooled before a batch can be assembled for treatment. This introduces inefficiencies in terms of using the heat associated with the manufacturing process. Simply put, allowing the casting to cool wastes thermal energy. The part must be reheated before undergoing further treatment, such as heat treating, quenching and aging a part.

In addition to an inefficient use of thermal energy, in some alloys cooling of the parts may also place additional stresses or reduce the quality of the finished part. For example, in a part including an alloy of aluminum and magnesium include mag suicides. When the part comes from being cast, the mag silicides are in suspension. Cooling the part below 750° F. results in the separation of the mag silicides from the structure of the part. The mag silicides do not remain in suspension below 750° F. Allowing the part to cool to a temperature where the mag suicides are no longer in suspension may result in a poorer quality finished part. Upon reheating, the mag silicides are put into suspension once again, but it is felt that the properties of a part that is cooled and then reheated may be lesser than a part that never cooled to a point where the mag silicides went out of suspension.

Therefore, it would be advantageous if a casting could be removed from a mold and then placed directly into a heat treatment process at an elevated temperature. The manufacturing process would be more efficient. In addition, some of the properties of the part may be enhanced since the part from the mold did not cool to room temperature. It would also be advantageous if the cycle times for heat treating, quenching and cooling a part could be reduced since this would eliminate a major bottleneck in the production flow. Current cycle times for heat treating, quenching, and aging can be as long as 24 hours and must be undertaken off-line in labor-intensive batch processing steps. The current technology also uses high amounts of energy for processing at temperatures of 1000° F. or more, with consequent heavy air emissions of various pollutants. In addition, when a part is sand cast, contaminated sand cores must be removed in a separate process and disposed of as waste when using current heat treatment, quenching and aging processes. This not only adds time, but also adds to the waste produced by the processing.

The root cause of high energy use and air emissions in heat treatment is the inefficiency of batch processing systems in which components are stacked in baskets and then placed in a convection or vacuum furnace. The long cycle time is required to assure that the entire component, no matter how complex or varied in thicknesses, is heated to sufficient temperature to alter the metal's molecular structure. To assure that inner surfaces and cores of thicker elements reach the specified temperature, the components must be left in the furnace for as long as 8–12 hours, with careful control of temperature to assure that eutectic melting does not occur on outer surfaces. Even recent advances, enabling gas-fired rather than electrical furnaces and other fluidized bed systems, still reduce heat treatment cycle time to no less than 4 hours.

There is also a need for a process which enables heat treatment, quenching and aging of a article, such as an aluminum casting, in a shortened cycle time, thereby eliminating the current bottleneck in manufacturing cast parts. Such a process would enable just-in- time manufacturing methods and allow for continuous in-line processing.

Thus, there is a need for a process which allows for heat-treating, quenching and aging on a manufacturing line having a continuous flow of parts. There is also a need for a process which will be energy efficient and ecologically friendly. There is also a need for a process which will provide for clean parts after the part or article has passed through the fluidizing bed. There is also a need for a reliable process which can hold temperatures very accurately and which will not break down frequently, thereby causing a costly shutdown of a manufacturing line. In addition, there is a need for a process which decors sand cast parts without producing a sand core waste product.

SUMMARY OF THE INVENTION

A process for heat treating, quenching and aging an article in less than three hours is disclosed. The method for heat treating, quenching and aging an article includes placing the article in a fluidized bed and conveying the article through the bed. The method may also include decoring which is the removal of sand from the molded part. The fluidized bed can be used to decore the part at the same time as heat treating the part. This allows for reclamation of the sand core and reduction of waste, as the sand cores were previously discarded as hazardous waste after removal. An elevator is used to place the article into the fluidized bed. Another elevator is used to remove the article from the fluidized bed. The system also includes a conveyor for moving the article into another fluidized bed. The article can then be placed into a number of fluidized beds and conveyed through each bed to heat treat quench and age the article. The article can be heat treated, quenched and aged in less than three hours. As a result, the process allows for just in time ("JIT") and in-line manufacturing.

Each fluidized bed is controlled so that a specific step can be applied to the article by the fluidized bed. The fluidized bed can be used as a portion of an automated production line. The process also provides considerable energy savings over current processes. Energy can be saved since cast parts can be loaded into the fluidized beds soon after removal from the mold. Less heat is required to reheat the part for heat treating, since the part is not allowed to cool to room temperature after removal from the mold. If the part is an alloy of aluminum and magnesium, the mag suicides also stay in suspension if the part is not allowed to cool to a temperature below 750° F. Less heat is required to reheat a part from 760° F. to 1000° F. than to reheat the part from 72° F. to 1000° F.

The fluidized bed includes a system for recycling the air passed through the sand in the furnace. The recycling system includes a fan positioned above the sand in the furnace, a filter for removing any sand within the recycled air, and piping for reintroducing the recycled air to the furnace. The retort is also insulated and enclosed with insulated doors which prevents heat loss. Gas-fired heater tubes are placed within the retort and include heat exchangers for heating the incoming combustion air with the exhaust air from the heater tubes. The heater tubes are rigidly attached at one end and fit within sleeves attached to another portion of the retort.

Advantageously, the fluidized-bed furnace provides for conveying the articles through the bed in a continuous fashion. The articles are cleaned of fluidizing media after they are removed from each of the fluidized beds by rotating the part and using air knives. The fluidizing media is then reintroduced or placed back into the fluidized-bed retort. This provides for a clean plant and overcomes objections of contaminating other processes in a production line. Doors for the fluid bed are also fully insulated. Insulated covers are also placed over the top of the furnace. A door or set of doors are placed at each end of the furnace. The first door or set of doors are opened to allow the part to be placed into the fluidized-bed furnace on one end, and then are closed. At the other end, the second door or set of doors are opened when the part is removed from the fluidized bed. The entire heater element is placed within a stainless steel tube which is bolted to the side of the retort on one end and which is positioned within a sleeve on the other end. The result is a sturdy construction which provides for reliable operation of the fluidized bed without failure. The construction also allows for burner replacement or repair without draining fluidizing media from the fluidized bed.

BRIEF DESCRIPTION OF THE DRAWINGS

The following detailed description of the preferred embodiments can best be understood when read in conjunction with the following drawings, in which:

FIG. 7 is a top view of an automated manufacturing line using a plurality of fluidized beds to apply a plurality of heat treatments to a part.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
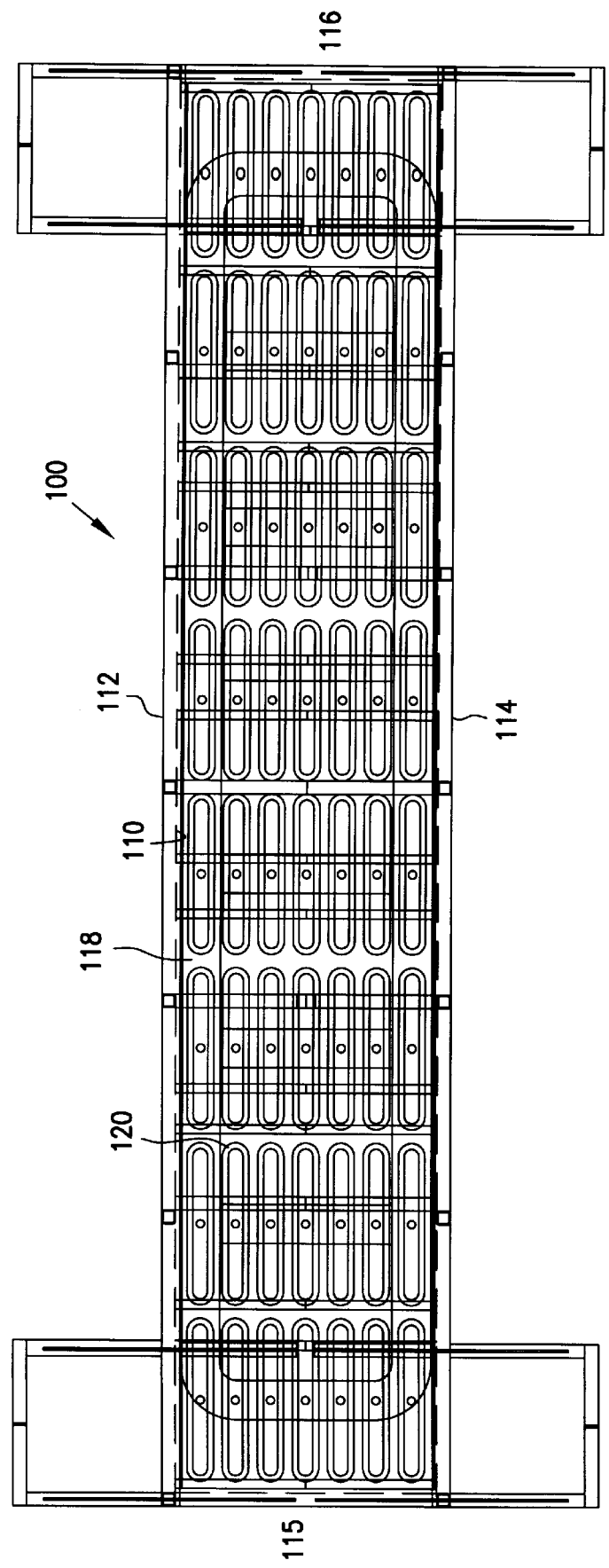
FIG. 1 is a top view of a fluidized bed according to this invention.

Now referring to FIGS. 1, 2 and 3, the basic component of the fluidized bed according to this invention will be discussed. FIG. 1 is a top view of a fluidized bed 100 with the covers (shown in FIG. 2) removed so that the components at the bottom of the fluidized bed can be readily seen. The fluidized-bed furnace can be filled with a variety of types of media, such as sand. The sand is also removed so that the components of the fluidized-bed furnace 100 can be seen. The fluidized-bed furnace 100 includes a retort 110. The retort 110 is the inner chamber of the fluidized-bed furnace. The retort 110 has a first sidewall 112, a second sidewall 114, a first end wall 115, a second end wall 116 and a V-shaped bottom 118. It should be noted that the bottom 118 need not be V-shaped, but could be flat or could be of any other desired shape. All the components of the furnace 100 are insulated to prevent heat loss from the furnace. Positioned near the bottom surface 118 of the retort are a plurality of fluidizing tubes 120. The fluidizing tubes 120 introduce the air that passes through the fluidizing medium placed in the fluidized-bed furnace 100. The fluidizing tubes 120 have openings which face the bottom surface 118 of the retort. In this way, as the air passes through the fluidizing tubes 120, the fluidizing medium will not be forced within the fluidizing tubes 120. It should be noted that the radiant tube burners (shown in FIGS. 2 and 3) are not shown in FIG. 1 so that the fluidizing tubes 120 can be more easily seen.

Figure 2:
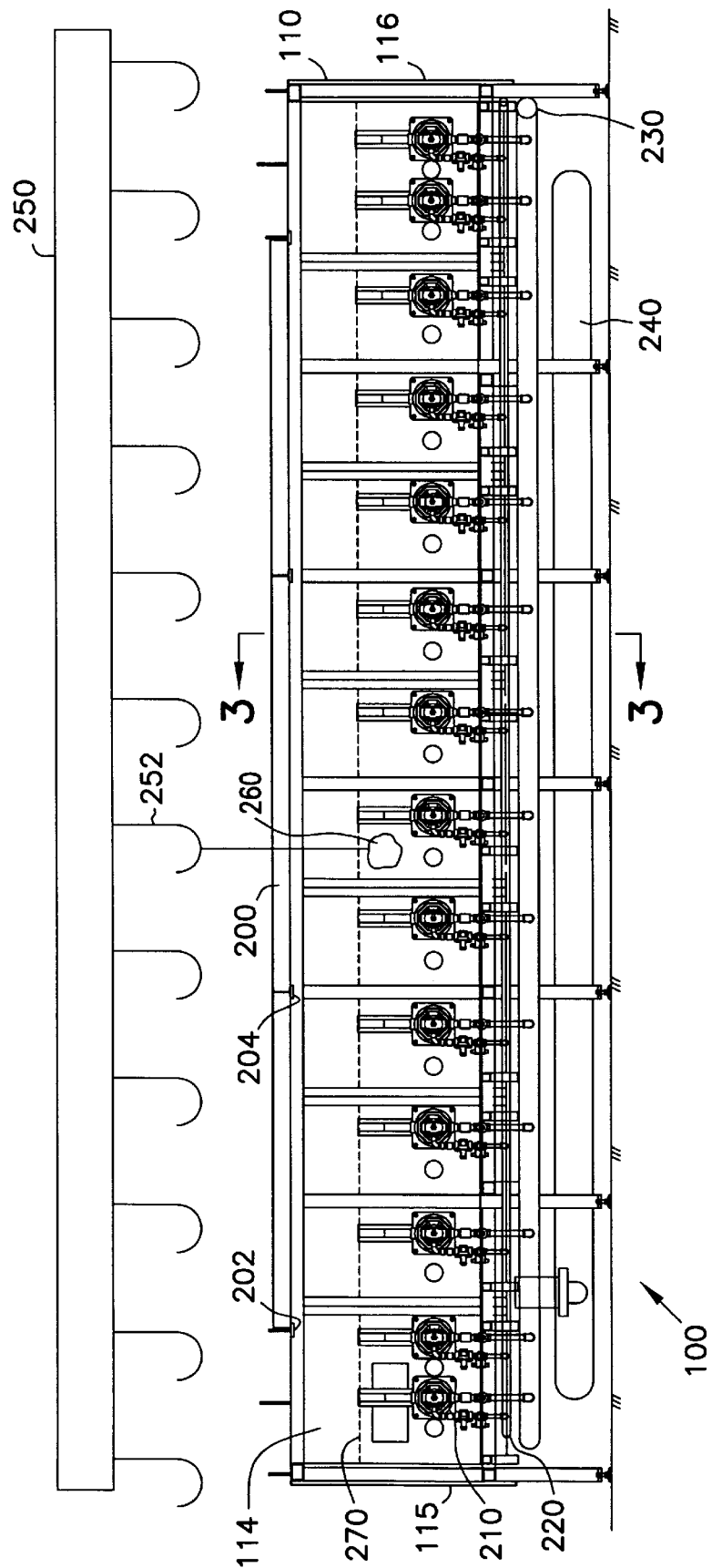
FIG. 2 is a side view of the fluidized bed shown in FIG. 1.

FIG. 2 is a side view of the fluidized-bed furnace 100 shown in FIG. 1. A cover 200 is placed atop the sidewalls 112 and 114 of the furnace 100. The cover 200 actually comprises a plurality of sections. The sections are supported by at least one of the sidewalls 112 or 114 and a series of angle irons, such as angle iron 202 and 204, which are positioned or attached to the top of the furnace 100. A plurality of radiant burner assemblies 210 are placed within the sidewalls 112 and 114 of the retort 110. As shown in FIGS. 2 and 3, half of the radiant burner assemblies 210 are attached to the first sidewall 112 of the retort 110. The other half of the radiant burner assemblies 210 are placed into the second sidewall 114 of the fluidized-bed furnace. It should be noted that the placement of the radiant burner assemblies 210 can be changed from that shown in FIG. 2 without departing from the spirit of this invention. The placement of the radiant burner assemblies 210 depends on several factors, including the amount of heat that is necessary to put into the fluidizing medium for a particular treatment process, the necessity to produce an even heating of the fluidizing medium and accessability of the radiant burner assemblies 210 at the manufacturing plant for maintenance and replacement.

Each radiant burner assembly 210 is bolted at the burner and to its respective sidewall. Still looking at FIGS. 2 and 3, positioned outside the retort 110 is a first combustion air manifold 220 and a second combustion air manifold 222. The first combustion air manifold 220 delivers combustion air to half of the radiant burner assemblies 210 and the second combustion air manifold 222 delivers combustion air to the other radiant tube heater assemblies 210. Also positioned outside the retort 110 is a first combustion air manifold 230 and a second combustion air manifold 232. The first combustion air manifold 230 delivers combustion air to half of the radiant tube air heater assemblies 210. The second combustion air manifold 232 delivers combustion air to the other half of the radiant tube heater assemblies 210. Also situated beneath the retort 110 is a fluidizing-tube manifold 240. The fluidizing-tube manifold is a plumb which delivers the fluidizing air to the fluidizing tubes 120 inside the retort 110. It should be noted that the fluidizing air can be air or any other gas such as nitrogen. The fluidizing manifold may also handle liquid nitrogen gas for a fluidized bed used in quenching a part. Also shown in FIG. 2 is an overhead conveyance mechanism 250. The overhead conveyance mechanism 250 includes a series of work holders 252 which are attached to the overhead conveyance system. Attached to the work holders 252 are articles that are to be heat treated by conveying the article 260 through the fluidized-bed furnace 100. It should be noted that the article 260 must be below the media level 270 which is indicated by a dotted line in FIGS. 2 and 3. Thus, the article 260 is submerged within media of the fluidized-bed furnace 100.

Figure 3:
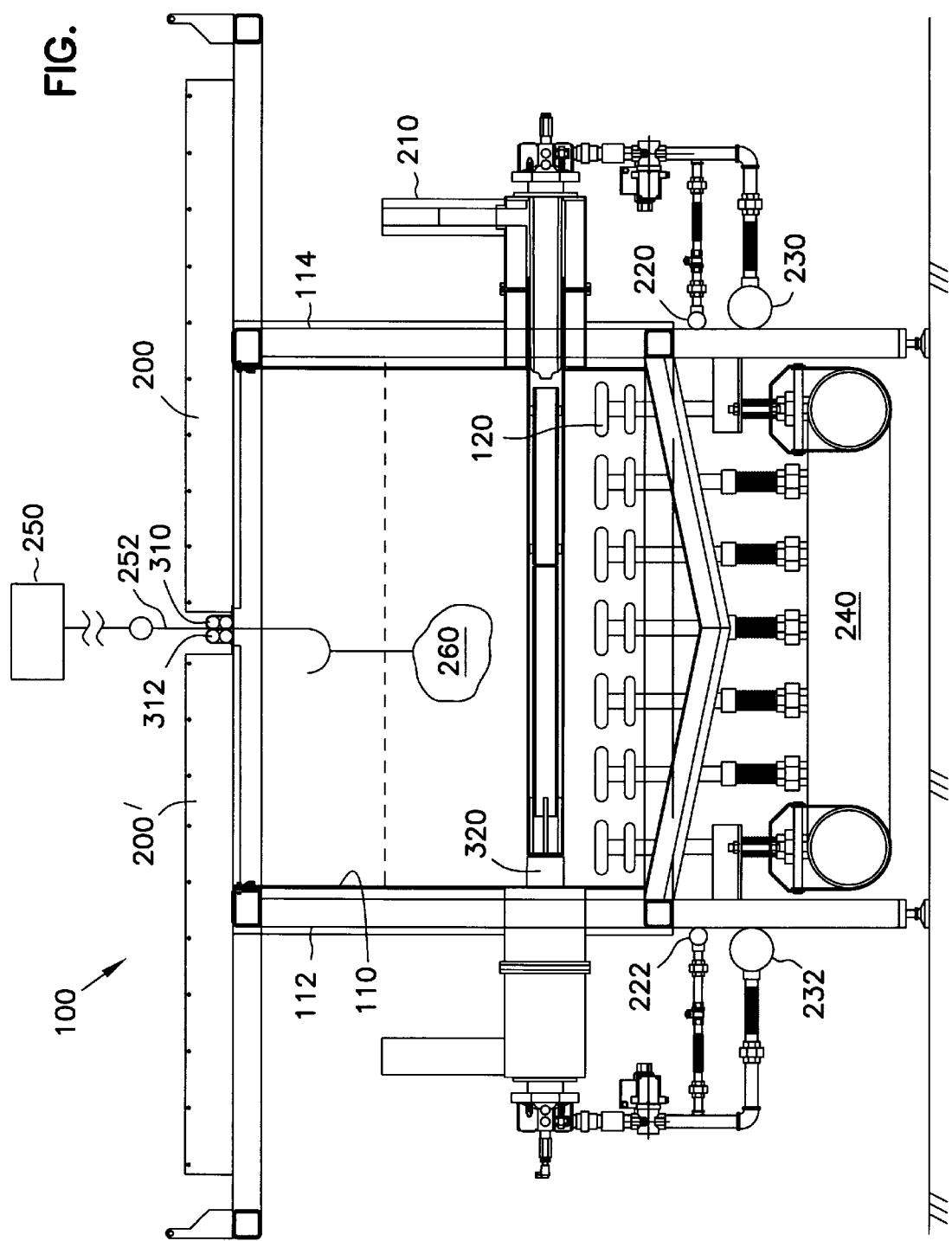
FIG. 3 is a cross-sectional view of the fluidized bed taken along line 3—3 in FIG. 2.

FIG. 3 shows a cross-sectional view of the fluidized bed taken along cut line 3—3 in FIG. 2. FIG. 2 shows a cover 200 positioned atop the furnace 100. The cover 200 is actually one-half of the cover. The other half of the cover is denoted by the reference numeral 200'. Each half of the cover includes a seal portion. Seal portion 310 is associated with cover 200 and seal portion 312 is associated with cover portion 200'. A work holder 252 passes between the seal portions 310 and 312 and conveys the article 260 through the fluidized-bed furnace 100. FIG. 3 also details the attachment of the radiant burner assembly 210 to the second sidewall 114 of the retort 110. The radiant burner assembly 210 includes an outer stainless steel sleeve which is bolted to the second sidewall 114 of the retort 110. The other end of the stainless steel tube is positioned within a sleeve 320 which is welded to the first sidewall 112 of the retort 110. The sleeve 320 supports the free end of the stainless steel tube of the radiant burner assembly 210. Advantageously, as the stainless steel tube and the radiant heat burner assembly 210 heat, the stainless steel tube can extend into the sleeve 320. The sleeve 320 also supports the radiant heat burner assembly 210 at its free end. The resulting structure allows for different thermal expansion rates as the radiant heat tube heats the fluidizing medium. In other words, the radiant heat burner assembly 210 can expand at a different rate than the retort 110 without causing stress at the various connection points. The resulting structure is also very strong in that the radiant heat burner assembly 210 is supported on both ends. It should also be noted that the bottom 118 of the retort 110 is V-shaped and sloped toward the center of the bottom 118. This allows for a collection point for the fluidizing medium. As mentioned previously, the bottom does not have to be V-shaped.

Figure 4:
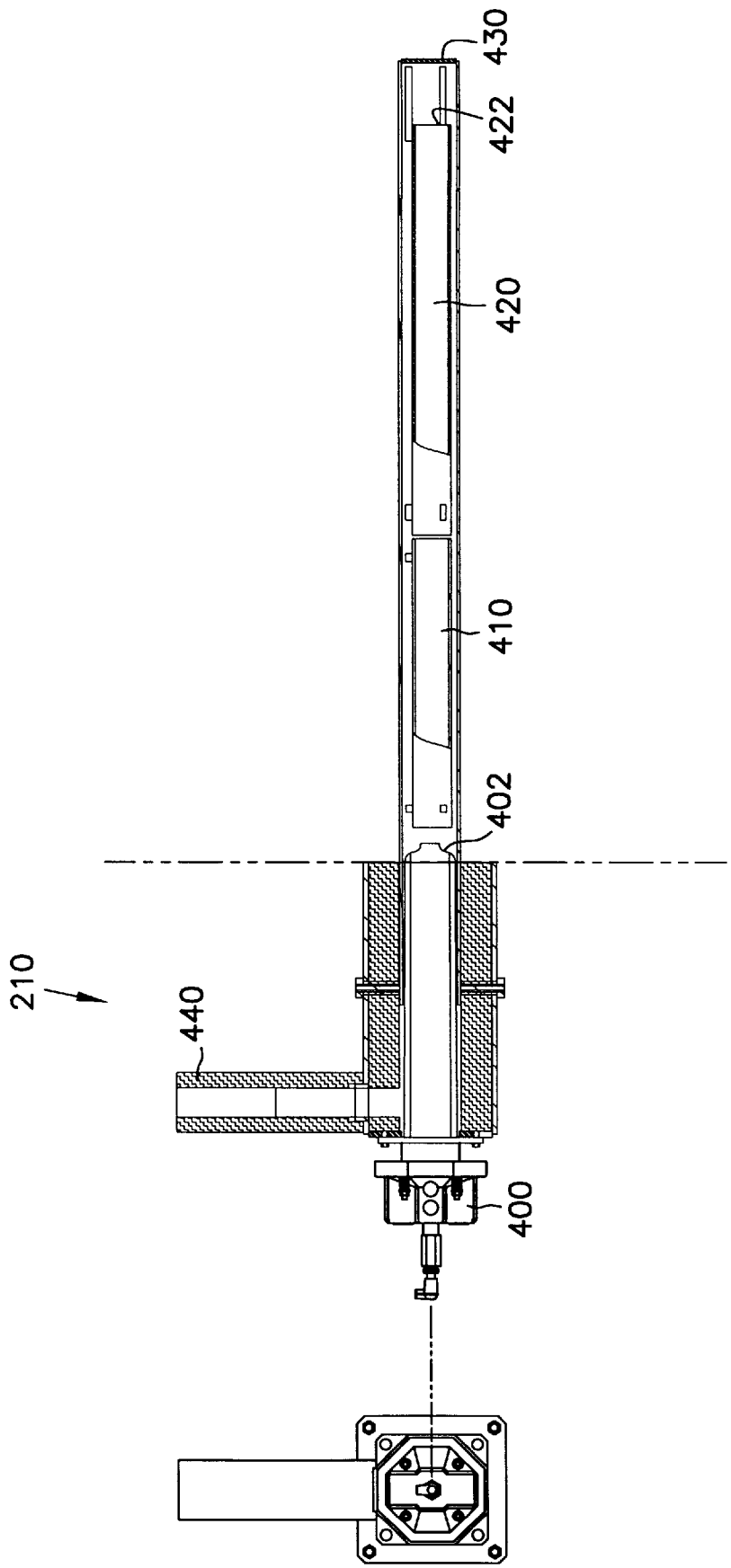
FIG. 4 is a side view of one of the radiant tube heater assemblies.

FIG. 4 is a side view of one of the radiant tube heater assemblies 210. The radiant heater assembly 210 is attached to one of the sidewalls 112, 114 or the retort 110. The radiant heater assembly 210 includes a recuperative burner 400 in which combustion air and a combustion fuel are mixed and ejected out of the open end 402 of the recuperative burner 400. The resulting flame passes through a silica carbide tube 410 and into the flame tube assembly 420. It should be noted that although a recuperative gas-fired burner as shown, other heat sources could also be used. Between the stainless steel tube 430 and the exhaust tube 440, the exhaust air passes through a heat exchanger 530, 532. The heat exchanger 530, 532 has the exhaust air on one side of the heat exchanger and the incoming combustion air for the recuperative burner 400. Advantageously, the exhaust air is then used to heat the incoming combustion air. This provides for a much more efficient system since the combustion air does not have to be heated from room air temperature, but rather can be heated from an elevated temperature above room air by virtue of the combustion air passing through the heat exchanger 530, 532. As a result, the process of combustion takes less energy since the combustion air is heated and the process of combustion does not have to heat the combustion air from room temperature to a combustion temperature.

Figure 5:
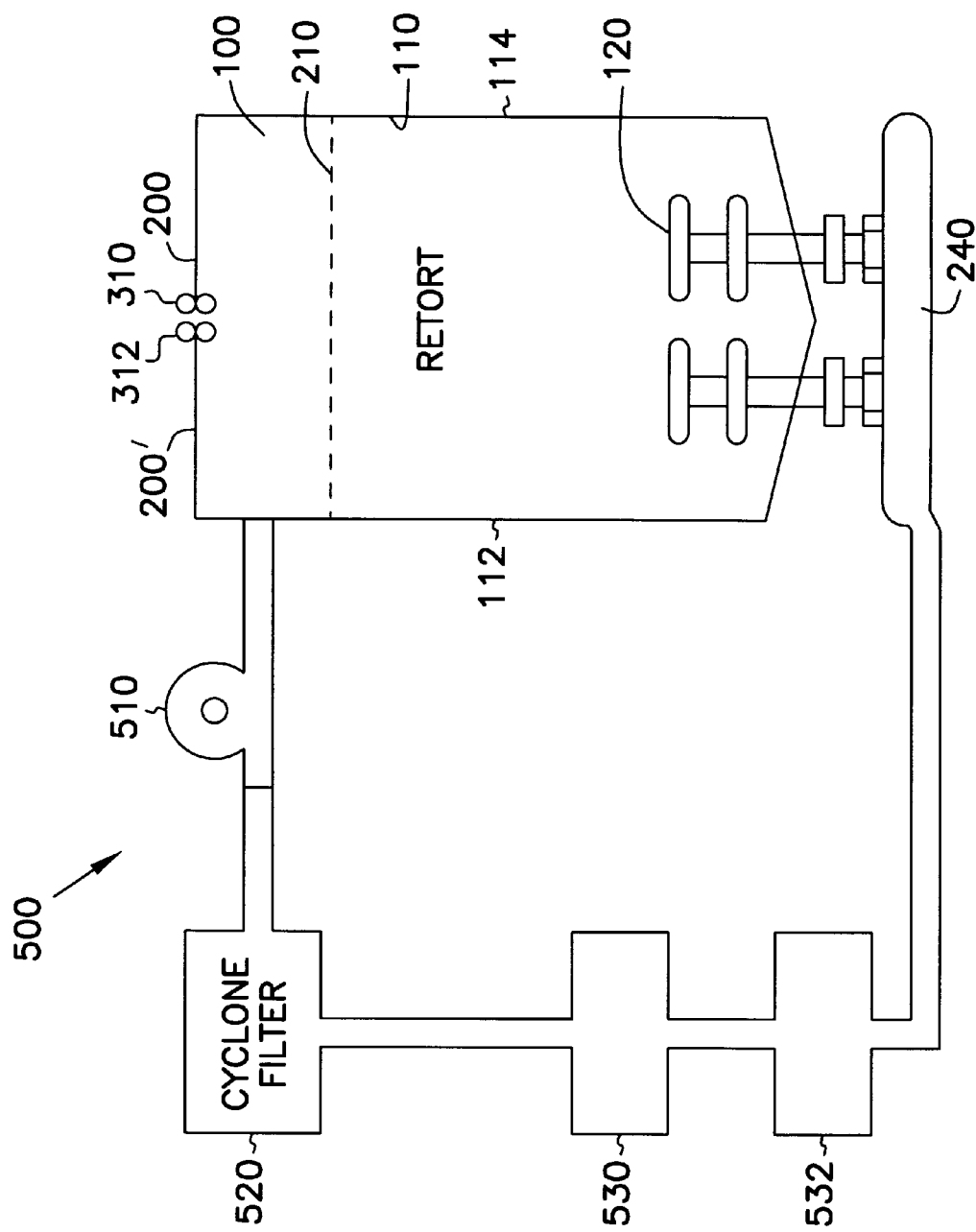
FIG. 5 is a schematic view of the air recirculation system associated with the fluidized bed in accordance with this invention.

FIG. 5 is a schematic view of a hot-air recirculation system 500 associated with the fluidized-bed furnace 100. The air recirculation system 500 also drastically reduces the cost of operation of the fluidized-bed furnace 100. The air recirculation system 500 includes an exhaust fan 510 attached to the retort above the sand level 270. The exhaust fan moves the fluidizing air to a filter 520 which removes any fluidizing medium from the air removed by the exhaust fan 510.

Typically, a cyclone filter is used as the filter 520. From the filter 520, the exhaust air is passed through a pair of heat exchangers 530 and 532. After passing through the heat exchanger 532, the air is then exhausted. Intake air passes through heat exchanger 530 which is heated by associated heat exchanger 532. The intake air then passes into the fluidizing-tube manifold 240. From the fluidizing-tube manifold 240, the air is then passed into the individual fluidizing tubes 120 within the retort 110 of the fluidized-bed furnace 100. This system saves energy since a portion of the heat form the exhaust air is used to heat the intake air. Some does escape through the seals 310 and 312 as well as through the doors atop the furnace 100. Since the fluidizing air is preheated via heat exchangers 530 and 532, and due to the fact that the radiant tube heater assemblies 210 use heat exchangers to heat the incoming combustion air, the end result is that the fluidized bed furnace 100 uses less than one-quarter of the energy associated with hot-air furnaces.

Figure 6:
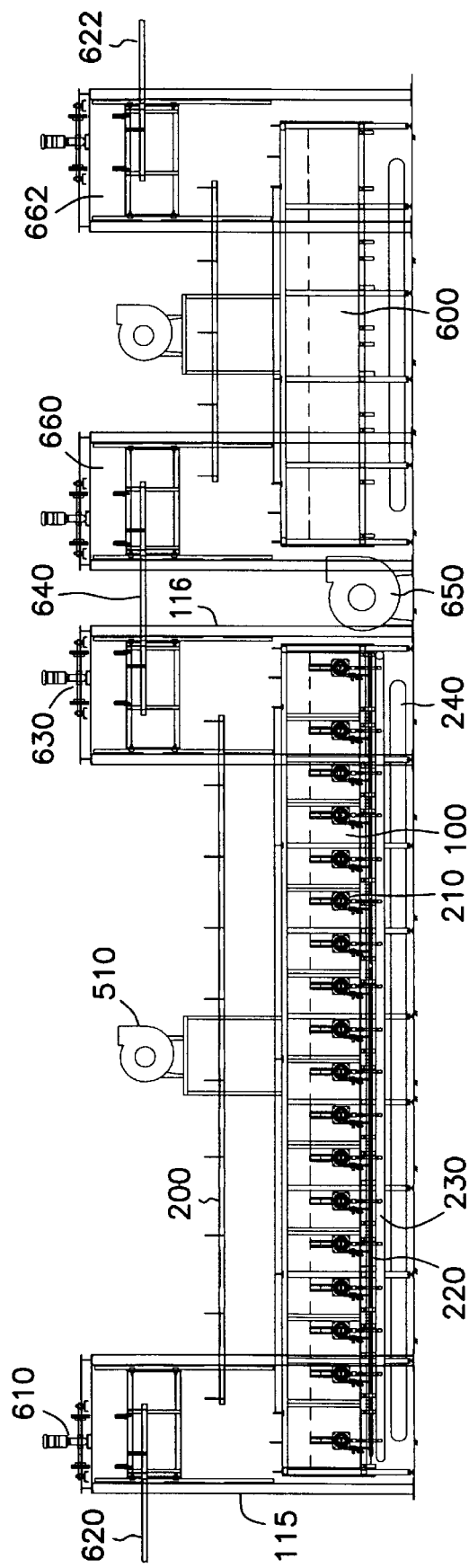
FIG. 6 is a side view of one station of an automated manufacturing line using one fluidized bed.

FIG. 6 is a side view of two fluidized beds used as stations in a manufacturing line. The first fluidized bed 100 is used as a heat-treating system. A second fluidized bed 600 is used to quench an article or part. The exhaust fan 510 for the fluidized-bed air recirculation system 500 is shown in FIG. 6. The portions of the recirculation system 500 are not shown in FIG. 6. Positioned near the first end wall 115 of the retort is an elevator 610 which takes parts 260 from the main conveyor line 620 and lowers them into the fluidized-bed furnace 100 for heat treatment. It should be noted that the main conveyor line 620 may be connected to receive molded parts directly from their molds. In other words, the main conveyor line 620 can receive parts after they are removed from their respective molds. The throughput of the fluidized-bed furnace 100 and the subsequent fluidized bed 600 allow the parts to be removed from their molds and directly input into the fluidized beds 100, 600 for heat treatment. The elevator 610 positioned near the first end wall 115 of the furnace 100 is commonly available as a Lowerator available from Richards Wilcox of Aurora, Ill. The elevator 610 places the part 260 directly into the fluidized bed so that heat treatment can start immediately. From the elevator 610, the parts are connected to the conveyance system of overhead conveyor system 250 and are passed through or along the length of the fluidized bed. The rate at which the parts are passed through the fluidized bed is selected so that the parts stay within the fluidized bed the length of time necessary to perform the heat treatment.

As the part 260 is conveyed through the fluidized bed to the other end, a second elevator 630 removes the part from the fluidized-bed furnace 100 and places the part 260 on a conveyor 640 to a subsequent elevator 660 associated with the second fluidized bed 600. Beneath the conveyor 640 is an exhaust blower 650. The exhaust blower or air knife is part of a sand-removal system which removes the fluidized-bed medium from the part 260 while it passes over the conveyor 640. The sand is recirculated and placed back into the fluidized-bed furnaces 100 and 600. Advantageously, by removing the sand from the part 260 while it moves over the conveyor 640, the remaining portions of the plant will be clean since sand will not be carried by the part after it's removed from the fluidized-bed furnace 100. As it passes over the conveyor 640, it is positioned in another elevator 660 which lowers it into the quench system fluidized bed 600. It should be noted that elevators 620, 630, 640 and 660 can be any means for moving a part 260 into and out of fluidizing beds 100 and 600. It should be realized that other moving means or elevators could be used and not depart from the spirit of this invention. The quench system-type fluidized bed quenches the part by exposing it to a lower temperature fluidized medium. It should be noted that most of the components of the fluidized bed 600 are the same as the components of the fluidized bed 100. The notable exception is that the fluidized bed 600 typically will not have radiant burner assemblies 210. The radiant burner assemblies 210 can be replaced with refrigeration coils so that the part is exposed to a controlled low-temperature fluidized bed 600. The length of the bed and the rate at which it conveys through the fluidized bed 600 is controlled so that the quench time is within a specified amount. Once the part or article 260 travels the length of the fluidized bed 600, it is removed from the fluidized bed 600 by another elevator 662 and placed back on to another section of the main conveyor line 622. It may be desirable to also age a part. Aging the part requires similar equipment to the equipment used to heat treat the part. The difference between aging and heat treatment is that the time and temperature associated with aging the part 260 differs from the time and temperature associated with heat treating the part 260. FIG. 7 shows a line which includes the treatments of heat treat, quench and aging.

FIG. 7 is a top view of an automated manufacturing line 700 using a plurality of fluidized beds to heat treat, quench and age an article 260. The overhead conveyance system 250 is driven by a driver 710. The overhead conveyance system 250 handles the part 260 as it passes through the fluidized bed 100, the fluidized bed 600 and the fluidized bed 720. The fluidized bed 100 is used to heat treat the part 260; the fluidized bed 600 is used to quench the part 260; and the fluidized bed 720 is used to age the part. A blower, an air knife 650, or rotating of the part 260 is used to remove sand from the first fluidized bed 100 as it travels along the conveyor between the first fluidizing bed 100 and the second fluidizing bed 600. The part 260 may be rotated while passing through an air knife or a blower. The first elevator 610 is located at one end of the bed 100 and the second elevator 630 is shown at the other end of the fluidized bed 100. After the sand is removed from the part 260, it is lowered into the second fluidized bed 600 by the elevator 660. The part then travels the length of the bed 600 and is removed from the bed 600 by the elevator 662.

The overhead conveyance system then moves the part 260 to an elevator 730 at the beginning of the fluidized bed 720. The overhead conveyance system moves the part through the bed 720 until it approaches the other end of the bed and is removed by another elevator 732. The elevator 732 removes the part 260 from the bed and another blower 750 for removing sand removes sand from the part. The clean part is then placed on another conveyor output from the heat-treating system for further processing along the manufacturing line.

The manufacturing line is controlled by a computer 760 which includes a control panel in the middle of the manufacturing line. The computer 760 includes a central processing unit and various microprocessors for controlling all aspects of the line. The computer 760 controls the length of time and the speed of conveyance of the parts through the various fluidized beds 100, 600 and 720. The computer 760 also controls the temperature of the beds.

Within each of the beds 100, 600 and 720 are various temperature sensors, such as thermocouples. For example, in the fluidized bed 100, the individual radiant burner assemblies 210 are fired when a thermocouple indicates that a temperature is too low at a particular spot within the fluidized bed. In the quench-type fluidized bed 600, a thermocouple detects when the temperature gets too high in an area of the bed. Refrigeration units near that thermocouple are turned on to bring the temperature down in the area of the quench-type fluidized bed 600. Using thermocouples and a feedback control loop system for each bed 100, 600 and 700, is very advantageous since the temperature of each of the beds can be controlled and maintained within a range of approximately 2–3 degrees. In previous hot-air furnace systems, temperature control varied over a range of approximately 50° F. Advantageously, since the temperature can be so tightly controlled, the quality and uniformity of the parts that are output from this heat-treating process are improved.

Using the equipment described above enables a process where a part 260 can be heat treated, quenched and aged in less than two hours. An aluminum alloy part can be passed through the fluidized bed 100 in 48 minutes while the temperature is held at 543° C. to heat treat the part. The part can then be quenched by passing the part through the fluidized bed 600 in 5–10 minutes while the temperature is held at 82° C. The part can then be aged by passing the part through the fluidized bed 600 in 50 minutes while the temperature is held at 178° C. The part heat treated, quenched and aged as discussed above has very good mechanical properties which are superior to the mechanical properties of parts treated by traditional means for heat treating, quenching and aging. The tables below show the tensile strength (Table 1), yield strength (Table 2), elongation (Table 3), impact value (Table 4), and hardness (Table 5) for four samples and the average values of the four samples subjected to the heat treat, quench and age times and temperatures mentioned above.

TABLE 1

TENSILE STRENGTH

|  | OR | IR | SP |
|---|---|---|---|
|  | 296.91 | 279.62 | 274.46 |
|  | 292.64 | 247.93 | 276.48 |
|  | 293.96 | 275.94 | 298.77 |
|  | 296.42 | 279.13 | 286.02 |
| Avg | 294.98 | 270.66 | 283.93 |

TABLE 2

YIELD STRENGTH

|  | OR | IR | SP |
|---|---|---|---|
|  | 210.08 | 196.57 | 215.04 |
|  | 211.82 | 190.08 | 211.82 |
|  | 207.99 | 201.43 | 209.03 |
|  | 212.12 | 205.24 | 211.77 |
| Avg | 210.5 | 198.33 | 211.91 |

TABLE 3

ELONGATION

|  | OR | IR | SP |
|---|---|---|---|
|  | 15.48 | 13.36 | 6.84 |
|  | 15.56 | 7.44 | 7.08 |
|  | 16.52 | 10.00 | 15.92 |
|  | 17.44 | 11.96 | 8.76 |
| Avg | 16.25 | 10.69 | 9.65 |

TABLE 4

IMPACT VALUE

|  | OR | IR | SP |
|---|---|---|---|
|  | 44.23 | 33.59 | 40.32 |
|  | 30.26 | 24.46 | 23.28 |

TABLE 4-continued

IMPACT VALUE

|  | OR | IR | SP |
|---|---|---|---|
|  | 50.08 | 37.19 | 27.98 |
|  | 41.48 | 34.82 | 27.58 |
| Avg | 41.51 | 32.52 | 29.79 |

TABLE 5

HARDNESS

|  | OR | IR | SP |
|---|---|---|---|
|  | 48.30 | 46.00 | 47.10 |
|  | 48.00 | 47.85 | 44.00 |
|  | 49.10 | 45.25 | 49.45 |
|  | 50.30 | 44.35 | 45.75 |
| Avg | 48.93 | 45.86 | 46.58 |

It should be pointed out that the time and temperatures for heat treating, quenching, and aging can be varied to vary the mechanical properties of the finished part. This is shown as one example for heat treating, quenching and aging a part.

The fluidized beds provide a rapid heat treatment, quenching, and aging system that enables in-line continuous processing of individual components, using fluidized sand as the media to reach rapidly all surfaces of the component.[3] Because each part 260 enters the system singly, rather than stacked in a batch, it reaches and holds the required temperature far more quickly. Components reached required tensile strength, yield strength, elongation, impact value, and hardness standards in less than 2 hours under this approach. The system uses a high speed automated line to bring parts 260 from casting to heat treatment bed 100. Connection via a high-speed automated line to the casting area that precedes treatment allows the cast component to retain most of its 750°+ temperature, thus reducing the amount of heat required for heat treatment in bed 100. If the part is an alloy of aluminum and magnesium, the mag suicides also stay in suspension if the part is not allowed to cool to a temperature below 750° F. Keeping the mag suicides in suspension is believed to result in a part having better mechanical characteristics. Less heat is required to reheat a part from 760° F. to 1000° F. than to reheat the part from 72° F. to 1000° F. A low speed line then moves each part 260 through the fluidized bed unit at a rate of 2 feet per minute. The rate of movement or conveyance of the part 260 through a particular bed can be varied depending on the length of the desired treatment. Upon completion, the part is removed to quenching and aging beds of similar design operated in the same manner.

While in the beds 100 and 720, the tube burner assemblies 210 are fired under control of computer 760. The thermocouples provide feedback, and the burners 210 are pulse-fired under CPU 760 control to inject heat directly into the media through sealed tubes. This provides far more precise, even, and rapid heat dispersion throughout the chamber than exterior heat sources, yet brings no flame into the chamber, thereby eliminating potentially unsafe conditions experienced with other fluidized bed designs. The pulse-fired burner assemblies save energy since the CPU 760 pulses only the burner assemblies in the area of the retort as needed to keep the fluidized bed evenly heated.

The system also eliminates pollution from casting sand waste containing isocyanate that remains in cores of components after heat treatment in current technologies. As a component or part is passed through the heat treatment bed 100, the binder in the core heats to remove the binder from the sand which breaks down the core. The sand from the core is added to the fluidizing medium. In other words, the binders in the sand core are reduced to their essential elements by the unit's temperature. The sand blends into the media within the unit. As the volume of sand builds up, it may be removed from the unit and reused for new casting. Previously, sand cores were discarded as waste. In addition, processing time is saved since each part does not have to be individually decored. In some manufacturing processes decoring takes hours of time in a process separate from heat treatment.

The line shown in FIG. 7 is a continuous line which also reduces cycle times. Continuous in-line processing, rather than batch-processing enables significantly lower cycle times because each individual component is heated directly and immediately via the media. Other key features relate to energy use and air emission. The system reduces energy use and air emissions not only through the significant reduction in cycle time but also through (1) closed loop reuse of the air used to fluidize the media, so that air is heated only once and is not dispersed into the atmosphere, and (2) a pulse-fired, microprocessor-controlled firing system that fires only as many burners as required to maintain temperature, and in short bursts.

Some key features also relate to the fluidizing media. The system solves the problem of escaping media in several ways: 1) It reduces violent motion through the use of double-layered air injection tubes that direct the force of the fluidizing air down and sideways rather than upward into the media; 2) Guillotine doors close tightly around the track moving the components through the system; and 3) Dual air knives clean the components of all media as they are removed from the unit, directing the media back into the bed.

Advantageously, the manufacturing line 700 which includes several heat-treating stations in terms of fluidized beds provides for a continuous process which is energy efficient and very reliable. The products or articles which undergo this heat-treating process are also very uniform in their properties. The process provides for heat treatment, quenching and aging of a part 260 in less than two hours. The parts also have superior properties. A rapid, in-line heat treatment system shown in FIG. 7 removes a major bottleneck in current production flow of key manufacturing sectors, such as the automotive and airline industries, which treat castings. The system eliminates the need for a separate decoring process for complex aluminum components, further reducing production time. In addition, the system produces parts with improved quality and reduces rejection rate waste. The improved structural strength possible with rapid in-line heat treatment and quenching also may reduce the amount of aluminum required per component while maintaining performance specifications. The system enables reclamation and reuse of casting sand from component cores, saving transportation, purchase and waste costs. The whole line is also very energy efficient since the fluidizing air is recirculated so that the fluidizing air does not have to be reheated or re-cooled. In addition, the radiant tube heating assemblies 210 also include heat exchangers for heating up the incoming combustion air. The end result is an energy savings of approximately 50–75% over other fluidized-bed systems. The fluidized beds are also very tough and do not break down which allows for more throughput in a factory needing to heat treat products. There are also less shutdowns due to heater failures.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A method for treating an article comprising the steps of:
   placing an article in a fluidized bed;
   conveying the article through the fluidized bed;
   lowering the article into the fluidized bed using a first elevator; and
   removing the article from the fluidized bed using a second elevator.

2. The method of claim 1 wherein the first elevator is in a first position with respect to the fluidized bed and wherein the second elevator is at a second position with respect to the fluidized bed.

3. The method of claim 1 wherein the step of conveying the article through the fluidized bed includes the step of removably attaching the article to a work holder which is moved by an overhead mechanism.

4. The method of claim 1 further comprising the step of recycling a portion of the air passed through the fluidized bed.

5. The method of claim 1 wherein the step of recycling a portion of the air used in the fluidized bed further comprises the step of filtering the air.

6. The method for treating an article of claim 3 further comprising the step of
   controlling the temperature of the fluidized bed using sensors placed in the media of the fluidized bed.

7. The method of claim 6 wherein the output from the sensors in the fluidized bed is used as feedback in a feedback control loop for determining when and where to apply heat to the fluidized bed.

8. The method of claim 6 wherein the step of conveying the article through the fluidized bed includes the step of removably attaching the article to a work holder which is moved by an overhead mechanism.

9. The method of claim 6 further comprising the step of recycling a portion of the air passed through the fluidized bed.

10. The method of claim 9 wherein the step of recycling a portion of the air used in the fluidized bed further comprises the step of filtering the air.

11. The method of claim 8 further comprising the step of recycling a portion of the heat necessary to fluidize the fluidized bed.

12. The method of claim 1 wherein the step of conveying the article through the fluidized bed includes conveying the article at a desired rate, said desired rate resulting in the time within the bed needed to heat treat the article.

13. The method of claim 1 further comprising the step of recycling a portion of the heat necessary to fluidize the fluidized bed.

14. The method for treating an article of claim 1 further comprising the step of heat treating the article for less than one hour.

15. The method for treating an article of claim 14 further comprising the step of aging the article for less than one hour.

16. The method for treating an article of claim 14 further comprising the step of quenching the article for less than thirty minutes.

17. The method for heat treating an article of claim 14 further comprising the steps of:
    quenching the article; and
    aging the article, wherein heat treating, quenching and aging the article takes less than two hours.

18. The method of claim 1 wherein the step of conveying the article through the fluidized bed includes the step of removably attaching the article to a work holder.

19. The method of claim 18 wherein the step of conveying the article through the fluidized bed includes moving the article with an overhead mechanism.

20. A method for heat treating articles comprising the steps of:
    conveying an article through a first fluidized bed;
    conveying the article through a second fluidized bed;
    removing the article from the first bed;
    moving the article to the second bed; and
    lowering the article into the second bed.

21. The method of claim 20 further comprising the step of removing media from the article while the article is between a first station and a second station.

22. The method of claim 20 further comprising the step of removing media from the article while the article is between a first station and a second station, said media removing step comprising the steps of:
    blowing sand from the article; and
    recycling the sand.

23. The method of claim 20 wherein,
    conveying the article through the first fluidized bed to heat-treat the article; and
    conveying the article through the second fluidized bed to quench the article.

24. A method for treating an article comprising the steps of:
    placing an article in a fluidized bed;
    conveying the article through the fluidized bed, wherein the step of conveying the article through the fluidized bed includes conveying the article at a desired rate, said desired rate resulting in the time within the bed needed to heat treat the article; and
    controlling the temperature of the fluidized bed using sensors placed in the media of the fluidized bed.

25. The method for treating an article of claim 24 wherein the step of treating an article includes heat treating the article for less than one hour.

26. The method for treating an article of claim 25 further comprising the step of aging the article for less than one hour.

27. The method for treating an article of claim 25 further comprising the step of quenching the article for less than thirty minutes.

28. The method for heat treating an article of claim 25 further comprising the steps of:
    quenching the article; and
    aging the article, wherein heat treating, quenching and aging the article takes less than two hours.

* * * * *

UNITED STATES PATENT AND TRADEMARK OFFICE
CERTIFICATE OF CORRECTION

PATENT NO. : 6,042,369
DATED : March 28, 2000
INVENTOR(S) : Bergman et al.

It is certified that error appears in the above-identified patent and that said Letters Patent is hereby corrected as shown below:

Column 13,
Line 31, claim 5, delete "claim 1" and insert -- claim 4 -- therefor.
Line 52, claim 11, delete "claim 8" and insert -- claim 6 -- therefor.

Signed and Sealed this

Second Day of October, 2001

Attest:

NICHOLAS P. GODICI
Attesting Officer
Acting Director of the United States Patent and Trademark Office